US011656611B2

(12) United States Patent
Takahashi et al.

(10) Patent No.: US 11,656,611 B2
(45) Date of Patent: May 23, 2023

(54) PRODUCTION PLAN CREATION DEVICE AND NON-TRANSITORY COMPUTER READABLE MEDIUM

(71) Applicant: FUJIFILM Business Innovation Corp., Tokyo (JP)

(72) Inventors: Ryosuke Takahashi, Kanagawa (JP); Kiyofumi Aikawa, Kanagawa (JP); Shuhei Kobayakawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 121 days.

(21) Appl. No.: 17/225,110

(22) Filed: Apr. 8, 2021

(65) Prior Publication Data

US 2022/0019201 A1    Jan. 20, 2022

(30) Foreign Application Priority Data

Jul. 17, 2020  (JP) .............................. JP2020-122635

(51) Int. Cl.
G05B 19/418  (2006.01)
(52) U.S. Cl.
CPC ... G05B 19/41865 (2013.01); G05B 19/4183 (2013.01); G05B 2219/32023 (2013.01); G05B 2219/34418 (2013.01)
(58) Field of Classification Search
CPC .......... G05B 19/41865; G05B 19/4183; G05B 2219/32023; G05B 2219/34418; G05B 2219/32252; Y02P 90/02
See application file for complete search history.

(56) References Cited

U.S. PATENT DOCUMENTS

| | | | |
|---|---|---|---|
| 9,841,755 B2 | 12/2017 | Yasuma et al. | |
| 2006/0197977 A1* | 9/2006 | Miyata | G06F 3/126 358/1.15 |
| 2014/0343999 A1* | 11/2014 | Kim | G06Q 10/06313 705/7.23 |
| 2015/0261216 A1* | 9/2015 | Yasuma | G05B 19/41865 700/100 |
| 2018/0373230 A1* | 12/2018 | Hamling | G05B 19/41885 |
| 2019/0041834 A1* | 2/2019 | Yamazaki | G05B 19/41865 |

FOREIGN PATENT DOCUMENTS

| | | |
|---|---|---|
| JP | 2002108439 | 4/2002 |
| JP | 2014081778 | 5/2014 |
| JP | 2015176239 | 10/2015 |

* cited by examiner

*Primary Examiner* — Christopher E. Everett (74) *Attorney, Agent, or Firm* — JCIPRNET (57) ABSTRACT

A production plan creation device includes a processor configured to receive, in a case of receiving a modification request to add a new task to an existing plan including plural tasks performed to produce a product using resources, a retention condition for retaining the plan for a task included in the existing plan, and modify the existing plan into a plan in which the plural tasks and the new task are performed using the resources while accounting for the retention condition and content of the new task.

14 Claims, 8 Drawing Sheets

PRODUCTION PLAN CREATION DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-122635 filed Jul. 17, 2020.

BACKGROUND

(i) Technical Field

The present disclosure relates to a production plan creation device and a non-transitory computer readable medium.

(ii) Related Art

For example, Japanese Unexamined Patent Application Publication No. 2002-108439 proposes a technology that determines an optimal production schedule for multiple products quickly and efficiently. The technology described in Japanese Unexamined Patent Application Publication No. 2002-108439 is a method of determining a production schedule for products with multiple brands, and is a scheduling method including: (1) a means of assigning a priority to each brand to be produced on the basis of the remaining stock of the product, and (2) a means of constructing an evaluation function that includes the divergence between the priority and the production order of the production schedule, and a production cost, and computing the production schedule using a solution to a combinatorial optimization problem.

For example, a work plan (schedule) for a worksite may need to be modified when tasks are added or removed, or when a situation such as an emergency stop of a machine occurs. At such times, the preparations and the like for the work based on the existing plan may already be underway in some cases, and therefore it is desirable to reduce the influence associated with a modification of a plan on the preparations and the like that are already underway. In cases where the existing plan contains complex steps, modifying the plan may take an enormous number of man-hours. In contrast, there has been proposed a technology that creates a plan based on a correction instruction while also avoiding large modifications to the existing previous plan and the content of the schedule, even in cases where a correction instruction is issued with respect to the previous plan. For example, the technology described in Japanese Unexamined Patent Application Publication No. 2014-081778 is configured as follows. Namely, master information about multiple received orders is stored, multiple correction instructions that correct the equipment to use and the start times for steps in the multiple orders to be corrected in the previous plan stored in advance are input, and a corrected plan proposal corresponding to each of the multiple correction instructions is created (S1 to S3). Each of the multiple corrected plan proposals is compared to the previous plan at each step, the total sum of the number of steps for which a succeeding step is changed to before the step, the number of steps added to each piece of equipment and the number of steps removed from each piece of equipment compared to the previous plan for each piece of equipment are counted as an evaluation value, and the corrected plan proposal having the smallest evaluation value is selected and output as the corrected plan (S4 to S6).

SUMMARY

An existing plan conceivably may be modified by changing machines or start times, and also by adding a task or the like. Consequently, it is desirable to be able to modify a plan while accounting for these modification conditions such as the addition of a task.

Aspects of non-limiting embodiments of the present disclosure relate to modifying a plan while also retaining an item desired by the user, even in cases where an existing plan is modified by adding a task.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a production plan creation device including a processor configured to receive, in a case of receiving a modification request to add a new task to an existing plan including plural tasks performed to produce a product using resources, a retention condition for retaining the plan for a task included in the existing plan, and modify the existing plan into a plan in which the plural tasks and the new task are performed using the resources while accounting for the retention condition and content of the new task.

BRIEF DESCRIPTION OF THE DRAWINGS

Exemplary embodiments of the present disclosure will be described in detail based on the following figures, wherein.

DETAILED DESCRIPTION

Hereinafter, exemplary embodiments of the present disclosure will be described with reference to the attached drawings.

Figure 1:
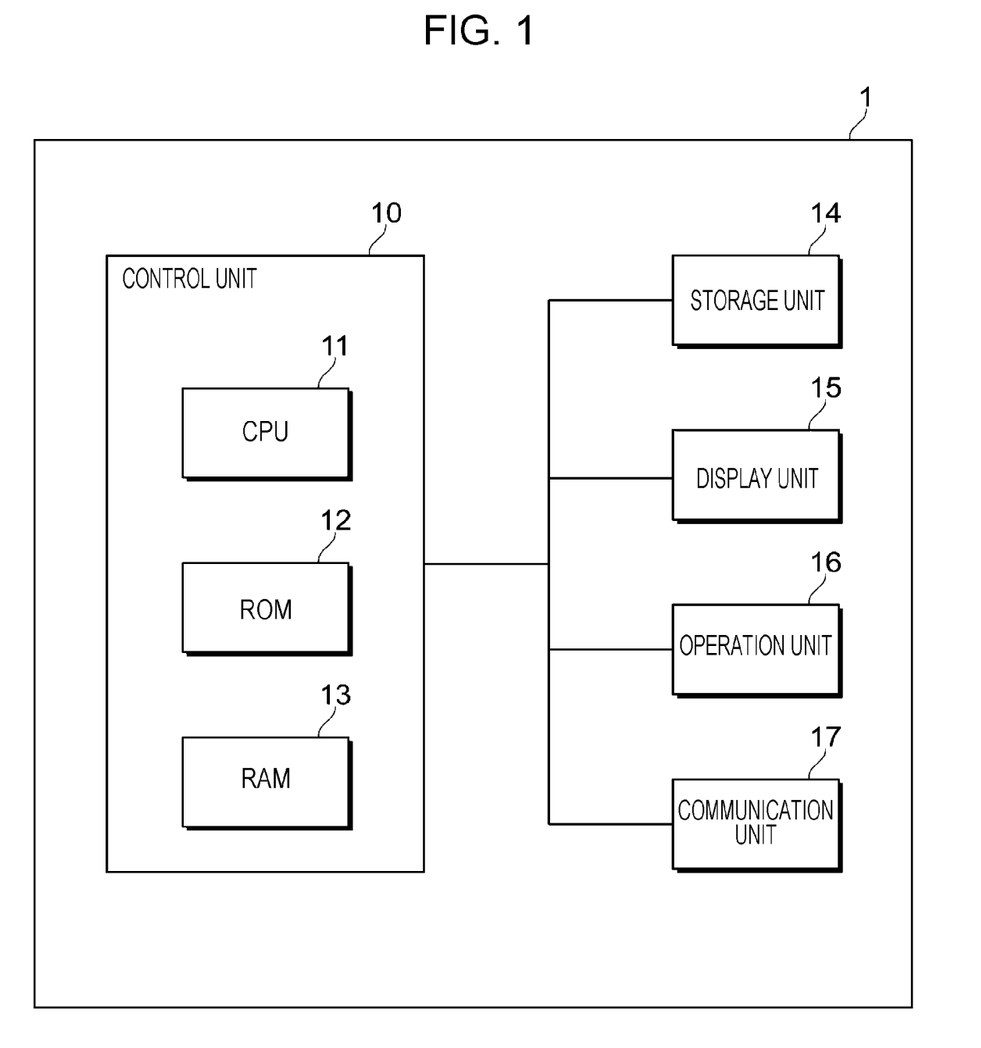
FIG. 1 is a diagram illustrating a hardware configuration example of a production plan creation device according to an exemplary embodiment.

FIG. 1 is a diagram illustrating a hardware configuration example of a production plan creation device 1 according to an exemplary embodiment.

The production plan creation device 1 according to the exemplary embodiment is a device that plans out dates and times when multiple products are to be produced at a site such as a factory that produces products using resources such as machines, for example. For example, in a factory that produces printed materials such as catalogs, posters, and flyers as examples of products, there is demand for printed materials requested for production using a printing machine as an example of a resource to be produced in time to meet a predetermined deadline. The production plan creation device 1 is a device that creates a production plan to meet deadlines while accounting for factors such as the time taken to produce the printed materials.

As illustrated in FIG. 1, the production plan creation device 1 is provided with a control unit 10. The control unit 10 includes a central processing unit (CPU) 11, read-only memory (ROM) 12 that acts as a storage area storing programs such as a basic input-output system (BIOS), and random access memory (RAM) 13 that acts as a program execution area.

The production plan creation device 1 is also provided with a storage unit 14 that stores various programs such as an operating system (OS) and applications, input data for the various programs, and output data from the various programs. The storage unit 14 may be a storage device such as a hard disk drive (HDD) or semiconductor memory, for example.

Additionally, the production plan creation device 1 is provided with a display unit 15 used to display an operation reception screen and images, an operation unit 16 that receives input operations from a user, and a communication unit 17 used to communicate with external devices.

The display unit 15 may be a liquid crystal display (LCD) or an organic EL (OLED) display, for example.

The operation unit 16 may be a keyboard, a mouse, or a touch panel, for example. In the case where the operation unit 16 is a touch panel, the touch panel functions as the operation unit 16 and the display unit 15.

The communication unit 17 may be a communication interface (communication I/F), for example.

The production plan creation device 1 may be a laptop personal computer (PC), a desktop PC, a tablet PC, a tablet, a personal digital assistant (PDA), or a multifunctional mobile phone (also known as a "smartphone"), for example.
(Controller 10)

Figure 2:
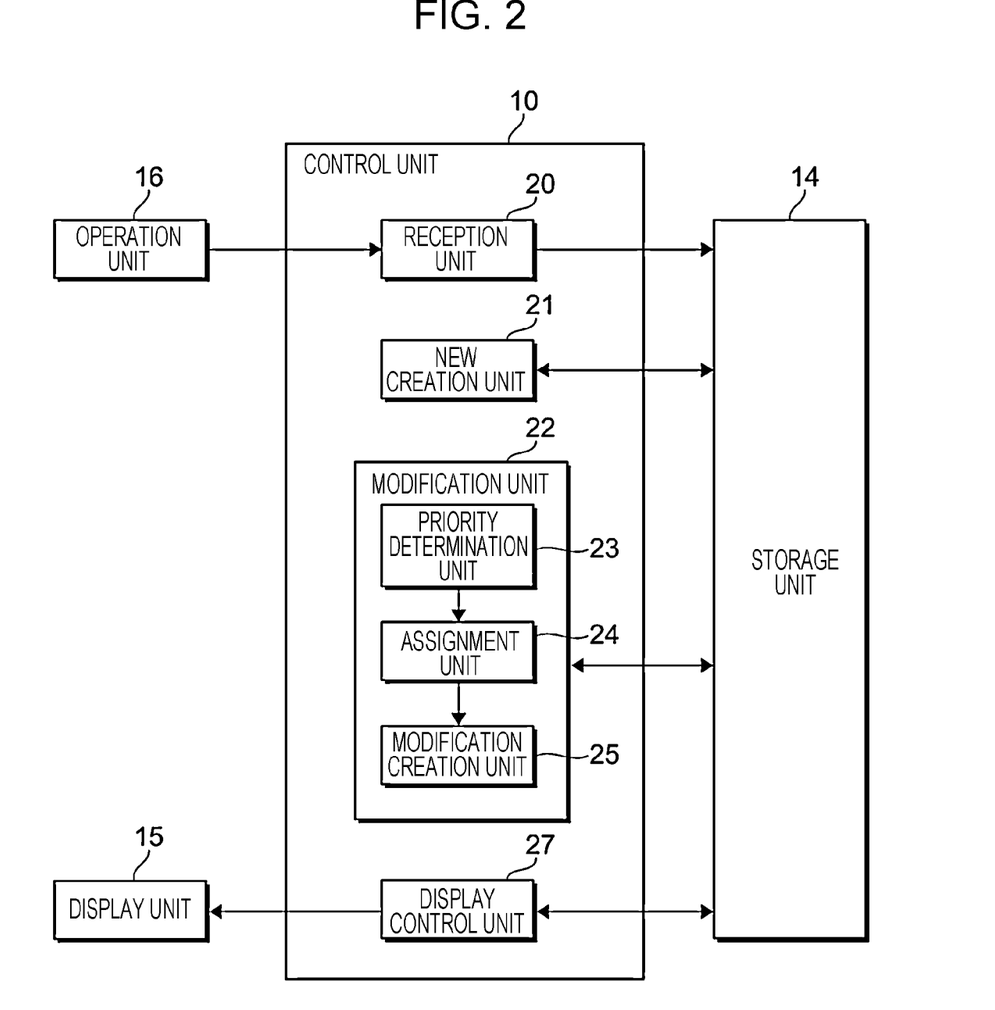
FIG. 2 is a diagram illustrating one example of a block diagram illustrating a functional configuration of a control unit.

FIG. 2 is a diagram illustrating one example of a block diagram illustrating a functional configuration of the control unit 10.

The control unit 10 includes a reception unit 20 that receives information input by the user through the operation unit 16. The control unit 10 also is provided with a new creation unit 21 that creates a new production plan and a modification unit 22 that modifies the plan created by the new creation unit 21. Additionally, the control unit 10 includes a display control unit 27 that causes the plan created by the new creation unit 21 or the plan modified by the modification unit 22 to be displayed on the display screen of the display unit 15.

Hereinafter, each component included in the control unit 10 will be described.

Here, in the following description, the case of producing requested printed materials will be illustrated as an example of tasks. In the case where the printed materials are a catalog for example, completing the printed materials may involve multiple steps such as a printing step, a cutting step, and a binding step, for example. The printing step is a step of a printing process executed by a printing machine on the basis of a print command that includes image data to be printed and settings for the process performed by the printing machine. The printing machine may be an offset printing machine or a digital image forming device such as a digital copier or a digital multi-function device, for example. Additionally, before the printing step, the print command is generated by performing work such as planning, editing, and layout of the printed materials after receiving image data provided by a client, and settings such as the number of pages or the number of copies to print and the type of paper to use for printing are determined. Also, a single print command is divided into the respective parts of the printed materials, such as "cover" and "body text" for example, and settings such as whether or not to perform the printing process for each part are also determined. Consequently, before the printing step, it is possible to predict how much work time will be taken in each of the steps such as the printing step, the cutting step, and the binding step, or how much preparation time will be taken between steps, until the printed materials are completed. Note that preparation time includes the time taken to transport materials between machines, such as from the printing machine to the cutting machine, for example.

In the case where the production of multiple printed materials is requested, ordinarily, a deadline is set by the request for each of the printed materials, and there is a demand to proceed with each step to meet the deadline. Accordingly, the control unit 10 plans out the date and time of each step while accounting for factors such as the running time and the stopped time of the machines such as the printing machine that performs a printing process in the printing step, the cutting machine that performs a cutting process in the cutting step, and a binding machine that performs a binding process in the binding step, and also factors such as the work times and break times of workers.
<Creation of New Plan>
(Reception Unit 20)

The reception unit 20 is capable of receiving information related to multiple tasks for which to create a production plan (hereinafter referred to as the "planning target tasks" in some cases) and information related to resources. The information related to planning target tasks may be a customer, a deadline, and a product shipping destination, for example. The information related to resources may be information about the running state of machines, information about the work times of workers, and the like.

The reception unit 20 receives information input by the user through the operation unit 16 and information transmitted from a processing device different from the production plan creation device 1, such as a laptop PC, a desktop PC, a tablet PC, a tablet, a personal digital assistant (PDA), or a multifunctional mobile phone (also known as a "smartphone").

The reception unit 20 stores the received information in a predetermined storage area in the storage unit 14.
(New Creation Unit 21)

The new creation unit 21 creates a production plan for the planning target tasks according to a predetermined method. The predetermined method may be the solution to a combinatorial optimization problem, for example. Also, the solution may be a genetic algorithm or a branch and bound algorithm.
(Display Control Unit 27)

The display control unit 27 outputs data to be displayed on the display screen of the display unit 15 to the display unit 15, and controls the display of the display screen.

The display control unit 27 causes the plan created by the new creation unit 21 to be displayed on the display screen of the display unit 15. With this arrangement, the user is able to look at the plan created by the new creation unit 21 through the display unit 15. The appearance of the display will be described in detail later.

<Modifying a Plan>

(Reception Unit 20)

The reception unit 20 is capable of receiving modification content. The modification content may be the addition of a task not included in an already-created plan, the modification or removal of a task included in an already-created plan, or the modification of machine information, for example. When receiving the addition of a task, the reception unit 20 is capable of receiving a specification of a start time and a specification of an end time. As a modification of a task, the reception unit 20 is capable of receiving a modification of the start time, a modification of the end time, a modification of the assigned machine, or a modification of the workload (for example, the number of pages to print). As a modification of machine information, the reception unit 20 is capable of receiving a modification of the running time of a machine, an addition of a stopped time of a machine, and a modification of the work time of a machine.

Additionally, the reception unit 20 is capable of receiving a retention condition indicating that modifying an item assigned in an already-created plan is undesirable, and retaining the assigned item is desirable. The retention condition may be a condition specifying a task to retain, specifying a time period to retain, specifying a machine to retain, specifying a worker to retain, or specifying a work time to retain, for example. Also, when receiving a specification of a task to retain, a specification for each step may also be receivable.

In the specification of a task to retain, the retention condition may be a condition for retaining the order between a specific task and another task performed before the specific task, or a condition for retaining the order between a specific task and another task performed after the specific task, for example. Also, the retention condition may be a condition for retaining the order between a specific task and another task performed before the specific task and the order between the specific task and another task performed after the specific task, for example. Furthermore, in the case of retaining the order between a specific task and another task, a condition disallowing a different task to be assigned in between the specific task and the other task may also be specifiable.

(Modification Unit 22)

The modification unit 22 is provided with a priority determination unit 23 that determines a priority for assigning the planning target tasks, an assignment unit 24 that assigns multiple tasks to resources such as machines and workers according to the priority determined by the priority determination unit 23, and a modification creation unit 25 that creates a modified plan.

(Priority Determination Unit 23)

The priority determination unit 23 acquires the modification information received by the reception unit 20. Also, the priority determination unit 23 extracts one or more tasks (hereinafter referred to as the "retained task" in some cases) related to a retention condition received by the reception unit 20 from among the planning target tasks which are the multiple tasks for which to create a production plan. In the case where a time period to retain is specified, the retained task is all tasks performed in the time period. Also, in the case where the specification of a task to retain includes a condition for retaining the order between a specific task and another task performed before or after the specific task as a retention condition, the retained task is the specific task and the other task.

Additionally, the priority determination unit 23 determines a priority for assigning the planning target tasks on the basis of the acquired modification information and the extracted retained task. When determining the priority, the priority determination unit 23 places the retained task at the front of the order by priority. Additionally, in the case where a task is not a retained task among the tasks included in the existing plan and the modification information is the addition of a new task, the priority determination unit 23 determines the priority of the new task according to a predetermined method. The predetermined method may be a rule-based method of arrangement by deadline or the solution to a combinatorial optimization problem, for example.

(Assignment Unit 24)

The assignment unit 24 assigns the planning target tasks to resources such as machines and workers in order according to the priority determined by the priority determination unit 23. At this time, in the case where a work method or processing method for tasks is specified, the assignment unit 24 assigns the tasks while accounting for the specification. For example, in the case where a machine or a worker is specified for a task, the task is assigned to that machine or worker. Note that the running times of machines and the assignment of workers to machines are set in advance. Also, in the case where the times of tasks and resources are specified, the assignment unit 24 assigns the tasks while accounting for the specification. For example, in the case where the time between a first step and another step in a single task is specified, the assignment unit 24 assigns the first step and the other step such that the time between the first step and the other step is longer than the specified time. Similarly, in the case where the time between a first task and another task at the same machine is specified, the assignment unit 24 assigns the first task and the other task such that the time between the first task and the other task is longer than the specified time. Also, in the case where a target work completion date and time is specified for a task, the task is assigned while accounting for the specification. For example, the assignment unit 24 assigns a task such that the task is completed earlier than the specified target work completion date and time. Also, in the case where an allowed quantity is specified as the inventory of work in process or a finished product, the assignment unit 24 assigns tasks such that the inventory of the work in process or finished product is less than the allowed quantity. Also, the assignment unit 24 assigns tasks while accounting for modifications such as a modification of a task or a modification of machine information included in the existing plan.

Also, in the case where a condition for retaining the order between a specific task and another task performed before or after the specific task is specified as a retention condition, the assignment unit 24 assigns the tasks while retaining the order.

When assigning tasks, every time a task is assigned, the assignment unit 24 calculates a deadline margin time of the task and also determines whether or not the deadline margin time is equal to or greater than a predetermined reference time. Note that the deadline margin time for a task is the amount of time obtained by subtracting the projected completion time of the last step in the task from the deadline, that is, the projected delivery date and time of the product produced by the task.

In the case where the deadline margin time is equal to or greater than the reference time, the assignment unit 24 assigns the next task in the order. On the other hand, in the case where the deadline margin time is shorter than the reference time, the assignment unit 24 assigns the task before a task earlier in the order than the assigned task. Thereafter, the assignment unit 24 recalculates the deadline margin time and again determines whether or not the deadline margin time is equal to or greater than the reference time. In this way, the assignment unit 24 assigns a task by moving the task earlier in the order until the deadline margin time is equal to or greater than the reference time. However, in the case where a task whose deadline margin time is determined to be shorter than the reference time is not movable to before a task earlier in the order than the assigned task, the assignment unit 24 maintains the assignment while storing an indication in the storage unit 14 to indicate that the task is assigned without satisfying the condition on the deadline margin time.

(Modification Creation Unit 25)

In the case where the assignment unit 24 assigns all of the planning target tasks, the modification creation unit 25 creates the assignment plan as the modified plan. At this point, in the case where a task assigned without satisfying the condition on the deadline margin time exists, the task is stored in the storage unit 14 in association with the plan.

(Display Control Unit 27)

The display control unit 27 causes the modified plan created by the modification creation unit 25 to be displayed on the display screen of the display unit 15. With this arrangement, the user is able to look at the plan created by the modification creation unit 25 through the display unit 15.

Note that the production plan creation device 1 may also include a mechanism for causing the modified plan created by the modification creation unit 25 to be printed. With this arrangement, the user is able to look at the final plan on a printed sheet.

Figure 3:
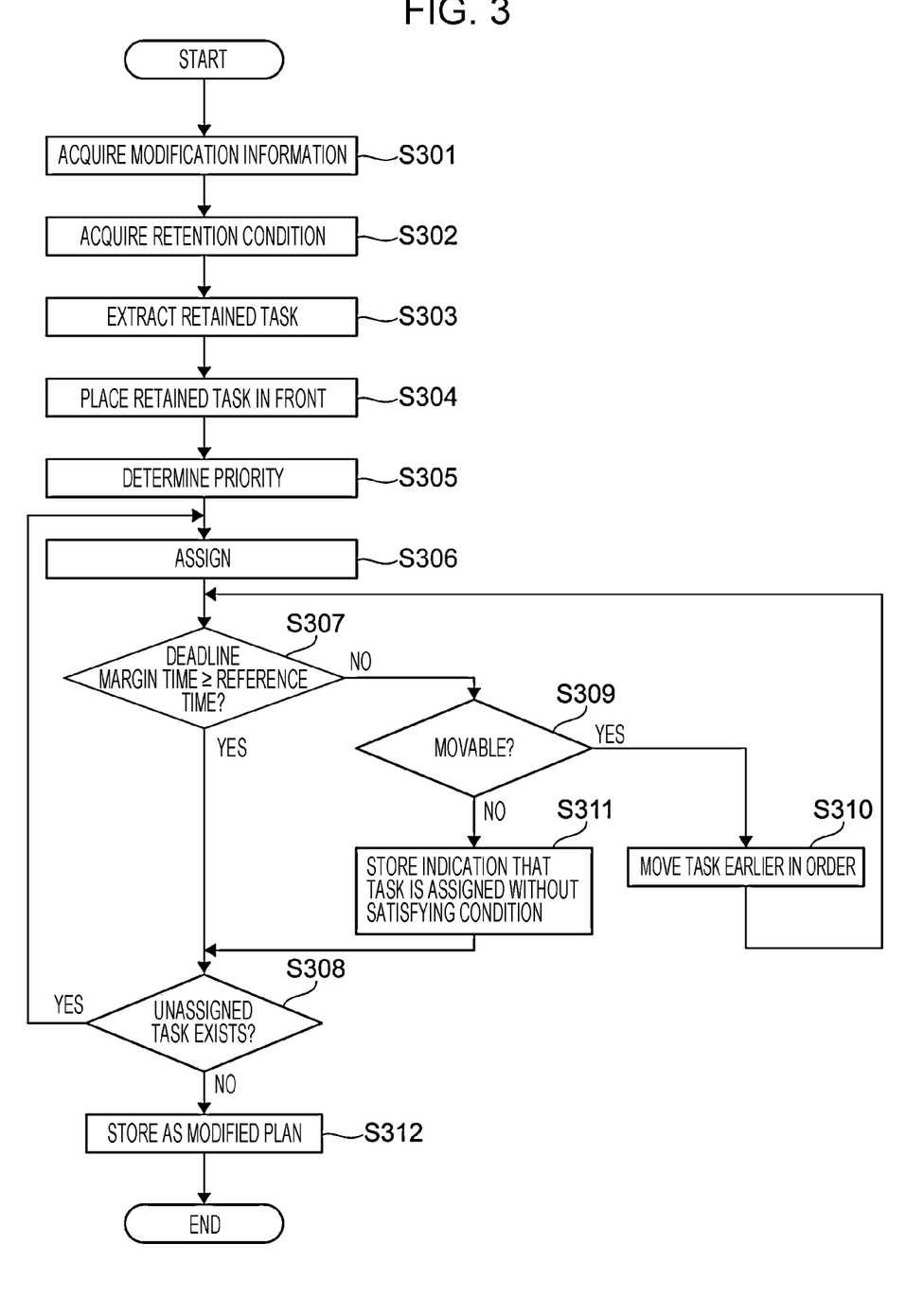
FIG. 3 is a flowchart illustrating one example of a production plan modification process.

Hereinafter, a production plan modification process performed by the modification unit 22 will be described using a flowchart.

FIG. 3 is a flowchart illustrating one example of a production plan modification process. The modification unit 22 executes the process upon receiving an instruction from the user. For example, in the case where a modification execution image 33 is specified on a plan display screen 30 described later that is displayed on the display screen of the display unit 15, the modification unit 22 recognizes that an instruction to perform the production plan modification process has been received.

First, the modification unit 22 acquires modification information (S301). For example, in the case where the modification information is information for the addition of a new task, information about the newly added task is acquired. Also, the modification unit 22 acquires a retention condition (S302). The process in S301 and S302 is the process performed by the priority determination unit 23, and the priority determination unit 23 acquires the modification information and the retention condition stored in a predetermined storage area of the storage unit 14.

Thereafter, the modification unit 22 extracts a task related to the retention condition (hereinafter referred to as the "retained task" in some cases) from among the planning target tasks, and also stores information about the retained task in a predetermined storage area of the storage unit 14 (S303). For example, in the case where the retention condition is a condition for retaining the assignment of a task on the morning of August 1, the task on the morning of August 1 is extracted and information about the task is also stored in the storage unit 14.

Next, the modification unit 22 places the retained task extracted in S303 at the front of the order by priority.

Additionally, in the case where a task is not a retained task among the tasks included in the existing plan and the modification information acquired in S301 is the addition of a new task, the priority of the new task is determined according to a predetermined method (S305). The predetermined method may be arranging tasks by deadline, for example.

The process from S303 to S305 described above is the process performed by the priority determination unit 23.

Thereafter, the modification unit 22 assigns the planning target tasks to machines and workers according to the priority determined in S305 (S306). Additionally, the modification unit 22 determines whether or not the deadline margin time of the task assigned S306 is equal to or greater than a reference time (S307). If the deadline margin time is equal to or greater than the reference time (S307, Yes), the modification unit 22 determines whether or not an unassigned task exists among the tasks in the order by priority determined in S305 (S308). In the case where an unassigned task exists (S308, Yes), the modification unit 22 performs the process from S306.

In the case where the deadline margin time is less than the reference time (S307, No), the modification unit 22 determines whether or not the task assigned in S306 is movable to an earlier place in the order (S309). In the case where the task is movable (S309, Yes), the modification unit 22 moves the task assigned in S306 earlier in the order (S310), and performs the process from S307. Otherwise, if the task is not movable to an earlier place in the order (S309, No), the modification unit 22 stores an indication in the storage unit 14 to indicate that the task assigned in S306 is assigned without satisfying the condition on the deadline margin time (S311), and performs the process from S308.

The process from S306 to S311 described above is the process performed by the assignment unit 24.

In the case where an unassigned task does not exist (S308, No), the modification unit 22 stores the current assignment in the storage unit 14 as the modified plan. At this point, in the case where a task assigned without satisfying the condition on the deadline margin time exists, the task is stored in the storage unit 14 in association with the plan. The process in S312 is the process performed by the modification creation unit 25.

<Display Screen of Display Unit 15>

Figure 4:
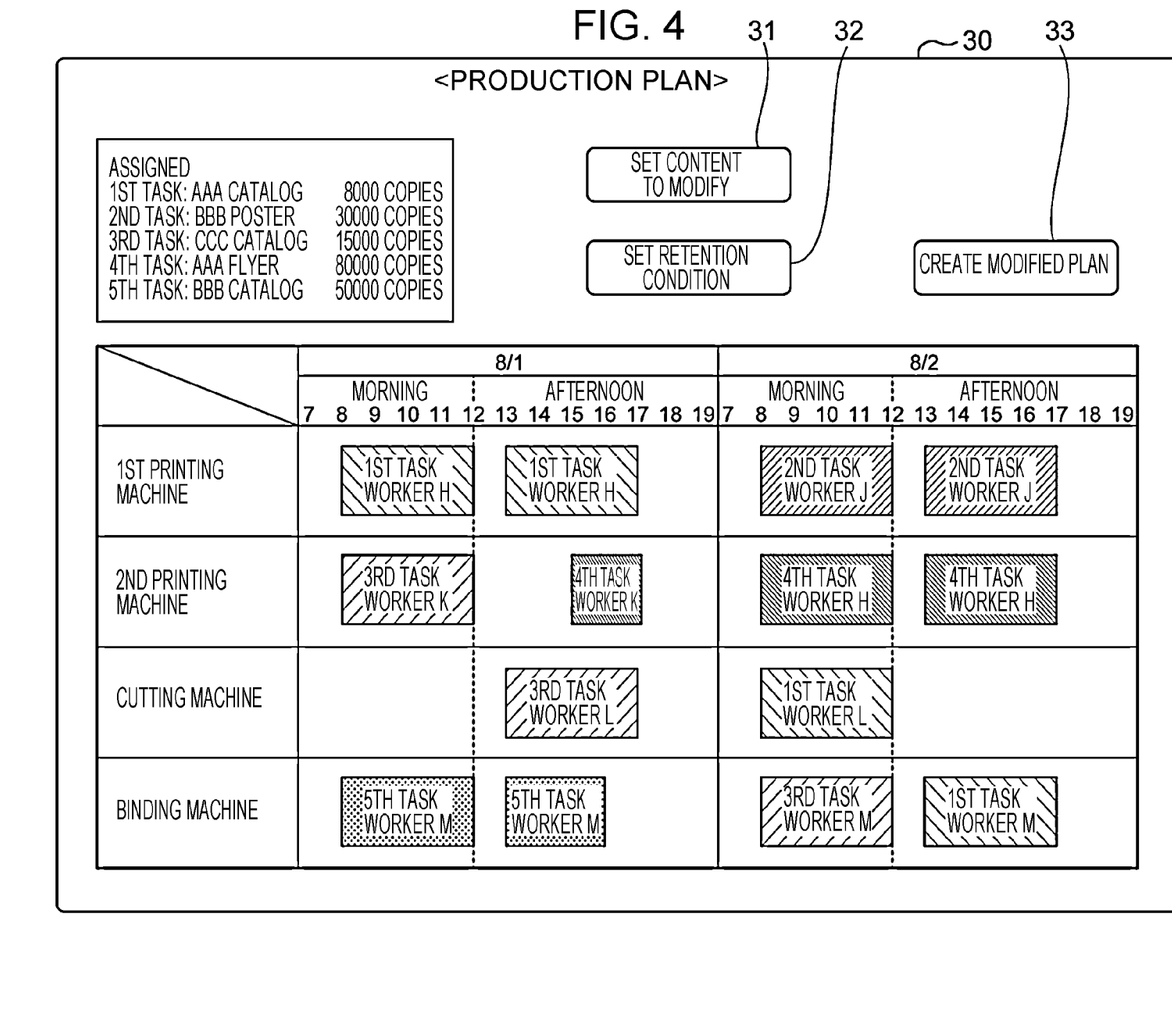
FIG. 4 is a diagram illustrating one example of a plan display screen 30 displayed on a display screen of a display unit.

FIG. 4 is a diagram illustrating one example of a plan display screen 30 displayed on the display screen of the display unit 15. FIG. 4 is a simplified illustration of a plan for only two days.

The display control unit 27 causes the plan created by the new creation unit 21 and the modified plan created by the modification unit 22 to be displayed on the display screen of the display unit 15. For example, as illustrated in FIG. 4, the display control unit 27 causes a plan display screen 30 that displays a plan for producing printed materials to be displayed on the display screen of the display unit 15.

In the plan illustrated in FIG. 4, with respect to a 1st printing machine, a printing step of a 1st task is assigned in the time periods from 8:00 to 12:00 and from 13:00 to 17:00 on August 1, and a printing step of a 2nd task is assigned in the time periods from 8:00 to 12:00 and from 13:00 to 17:00 on August 2. Also, with respect to a 2nd printing machine, a printing step of a 3rd task is assigned in the time period from 8:00 to 12:00 on August 1, and a printing step of a 4th task is assigned in the time periods from 15:00 to 17:00 on August 1, from 8:00 to 12:00 on August 2, and from 13:00 to 17:00 on August 2. Also, with respect to a cutting machine, a cutting step of the 3rd task is assigned in the time period from 13:00 to 17:00 on August 1, and a cutting step of the 1st task is assigned in the time period from 8:00 to 12:00 on August 2. Also, with respect to a binding machine, a binding step of a 5th task is assigned in the time periods from 8:00 to 12:00 and from 13:00 to 16:00 on August 1, a binding step of the 3rd task is assigned in the time period from 8:00 to 12:00 on August 2, and a binding step of the 1st task is assigned in the time period from 13:00 to 17:00 on August 2.

Also, in the plan illustrated in FIG. 4, a worker H is assigned to the 1st printing machine on August 1, and a worker J is assigned to the 1st printing machine on August 2. Also, a worker K is assigned to the 2nd printing machine on August 1, and the worker H is assigned to the 2nd printing machine on August 2. Also, a worker L is assigned to the cutting machine on August 1 and August 2. Also, a worker M is assigned to the binding machine on August 1 and August 2.

In addition, the display control unit 27 causes a modification setting image 31 labeled "Set Content to Modify" that receives plan modification settings to be displayed on the plan display screen 30 displayed on the display screen of the display unit 15. The display control unit 27 also causes a retention setting image 32 labeled "Set Retention Condition" that receives a retention condition setting to be displayed on the plan display screen 30. The display control unit 27 also causes a modification execution image 33 labeled "Create Modified Plan" that receives modifications to the current plan to be displayed on the plan display screen 30.

Figure 5:
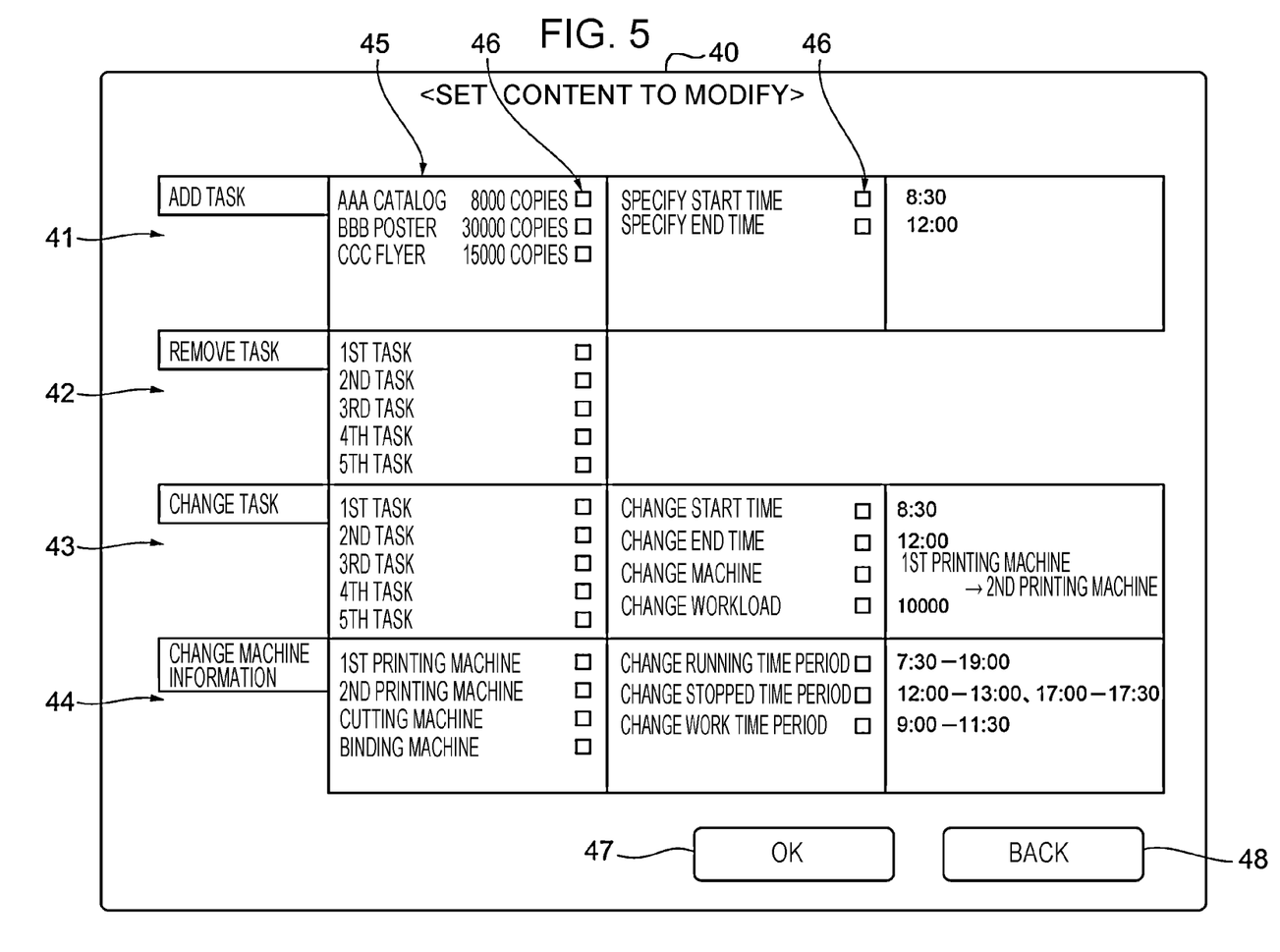
FIG. 5 is a diagram illustrating one example of a modification reception screen.

FIG. 5 is a diagram illustrating an example of a modification reception screen 40.

In the case where the modification setting image 31 displayed on the plan display screen 30 is specified, the display control unit 27 causes the modification reception screen 40 that receives modifications to the plan as illustrated in FIG. 5 to be displayed on the display unit 15. Note that the case where the modification setting image 31 is specified may be when the left button of a mouse is pressed while a cursor is positioned over the modification setting image 31, or in other words when the modification setting image 31 is clicked, or when a finger is used to press the modification setting image 31 displayed on a touch panel, for example. Otherwise, the case where the modification setting image 31 is specified may be when a finger is used to touch the modification setting image 31 displayed on a touch panel, or when a confirmation button is pressed (such as by pressing the Enter key on a keyboard) while the modification setting image 31 is in a selected state (such as while the modification setting image 31 is highlighted), for example. However, the configuration is not limited to the above, and the modification setting image 31 may also be selected according to another method. Hereinafter, the same also applies to the case where another image (for example, the modification execution image 33) is specified.

The display control unit 27 causes respective fields for receiving modifiable items for adding a task, removing a task, modifying a task, and modifying machine information, namely, a task addition field 41, a task removal field 42, a task modification field 43, and a machine information modification field 44, to be displayed on the modification reception screen 40. Additionally, the display control unit 27 causes a list 45 of desired content to modify and a selection field 46 for making the content selectable beside the content to be displayed on the modification reception screen 40. Additionally, the display control unit 27 causes a confirmation image 47 labeled "OK" that receives an instruction confirming the content of the modification and a back image 48 labeled "Back" that receives an instruction to go back to the plan display screen 30 to be displayed on the modification reception screen 40. The display control unit 27 causes the plan display screen 30 to be displayed in the case where the back image 48 is specified.

The display control unit 27 causes a list of unassigned tasks to be displayed in an "Add Task" field. Also, the display control unit 27 causes an item for receiving a start time specification and an item for receiving an end time specification of a task to add to be displayed in the "Add Task" field. In the case where the start time specification or the end time specification is selected, the display control unit 27 causes a time selection screen (not illustrated) enabling the selection of a desired time to specify to be displayed. The time selection screen may be a screen displaying times from 0:00 to 24:00 at 30-minute intervals, such as 9:00, 9:30, and 10:00, for example. Additionally, when a time is selected on the time selection screen, the selected time is displayed beside the corresponding item for specifying the start time or the item for specifying the end time. FIG. 5 illustrates an example of a case where "8:30" is selected as the start time and "12:00" is selected as the end time. Note that in the case where the start time is not specified, a blank field is displayed instead of "8:30", and in the case where the end time is not specified, a blank field is displayed instead of "12:00".

The display control unit 27 causes a list of already-assigned tasks to be displayed in a "Remove Task" field.

The display control unit 27 causes a list of already-assigned tasks to be displayed in a "Change Task" field. Also, the display control unit 27 causes "Change Start Time", "Change End Time", "Change Machine", and "Change Workload" fields to be displayed as modifiable items for modifying a task. In the case where the start time modification or the end time modification is selected while any task (for example, the 1st task) is selected, the display control unit 27 causes the time selection screen (not illustrated) described above enabling the selection of a desired time to modify to be displayed. Additionally, when a time is selected on the time selection screen, the selected time is displayed beside the corresponding item for modifying the start time or the item for modifying the end time. FIG. 5 illustrates an example of a case where the start time is changed to "8:30" and the end time is changed to "12:00". Note that in the case where the start time is not modified, a blank field is displayed instead of "8:30", and in the case where the end time is not modified, a blank field is displayed instead of "12:00".

In the case where "Change Machine" is selected, the display control unit 27 causes a list of machines to which the corresponding task is assigned to be selectably displayed. Also, in the case where one of the selectable machines being displayed is selected, the display control unit 27 causes machines to which the task may be assigned instead of the corresponding machine to be displayed. For example, in the case where "Change Machine" is selected while "1st Task" is selected, the display control unit 27 causes the 1st printing machine, the cutting machine, and the binding machine to which the 1st task is assigned to be selectably displayed. Additionally, in the case where the 1st printing machine is selected, for example, the 2nd printing machine to which the 1st task may be assigned instead of the 1st printing machine is selectably displayed. FIG. 5 illustrates an example of a case where the 1st printing machine is changed to the 2nd printing machine. Note that in the case where the machine is not modified, a blank field is displayed.

In the case where "Change Workload" is selected while a task is selected, the display control unit 27 causes a quantity selection screen (not illustrated) enabling the selection of the number of copies or the number of pages of printed material to be produced by the corresponding task to be displayed. The quantity selection screen may be a screen displaying numbers from 0 to 100000 at intervals of 500, such as 500, 1000, and 1500, for example. FIG. 5 illustrates an example of a case where the workload is changed to 10000. Note that in the case where the workload is not modified, a blank field is displayed.

The display control unit 27 causes a list of machines already assigned in the current production plan to be displayed in the "Change Machine Information" field. Also, the display control unit 27 provides "Change Running Time Period", "Change Stopped Time Period", and "Change Work Time Period" fields as modifiable items for modifying the machine information.

In the case where "Change Running Time Period" is selected while a machine is selected, the display control unit 27 causes the time selection screen described above enabling the selection of a desired time to specify as the running start time or the running end time to be displayed. Additionally, in the case where a time is selected on the time selection screen, the selected running time period is displayed beside the item for modifying the running time period. FIG. 5 illustrates an example of a case where "7:30 to 19:00" is selected as the running time period. Note that in the case where the running time period is not modified, a blank field is displayed instead of "7:30 to 19:00".

Also, in the case where "Change Stopped Time Period" is selected while a machine is selected, the display control unit 27 causes the time selection screen described above enabling the selection of a desired time to specify as the stopped start time or the stopped end time to be displayed. Additionally, in the case where a time is selected on the time selection screen, the selected stopped time period is displayed beside the item for modifying the stopped time period. FIG. 5 illustrates an example of a case where "12:00 to 13:00, 17:00 to 17:30" is selected as the stopped time period. Note that in the case where the stopped time period is not modified, a blank field is displayed instead of "12:00 to 13:00, 17:00 to 17:30".

Also, in the case where "Change Work Time Period" is selected while a machine is selected, the display control unit 27 causes the time selection screen described above enabling the selection of a desired time to specify as the work start time or the work end time to be displayed. Additionally, in the case where a time is selected on the time selection screen, the selected work time period is displayed beside the item for modifying the work time period. FIG. 5 illustrates an example of a case where "9:00 to 11:30" is selected as the work time period. Note that in the case where the work time period is not modified, a blank field is displayed instead of "9:00 to 11:30".

In the case where the confirmation image 47 displayed on the modification reception screen 40 is specified, the display control unit 27 causes the plan display screen 30 to be displayed.

In the case where the selection field 46 beside desired content to specify is specified and the confirmation image 47 is specified while a mark indicating selection (such as a check mark, for example) is displayed, the reception unit 20 receives the modification to the item of the corresponding content. Also, in the case where the confirmation image 47 is specified while a start time or an end time is specified in the task addition field 41, the reception unit 20 receives the specification. Also, in the case where the confirmation image 47 is specified while a start time or an end time is modified in the task modification field 43, the reception unit 20 receives the modification. Also, in the case where the confirmation image 47 is specified while a machine is modified in the task modification field 43, the reception unit 20 receives the modification. Also, in the case where the confirmation image 47 is specified while a workload is modified in the task modification field 43, the reception unit 20 receives the modification. Also, in the case where the confirmation image 47 is specified while a running time period is modified in the machine information modification field 44, the reception unit 20 receives the modification. Also, in the case where the confirmation image 47 is specified while a stopped time period is modified in the machine information modification field 44, the reception unit 20 receives the modification. Also, in the case where the confirmation image 47 is specified while a work time period is modified in the machine information modification field 44, the reception unit 20 receives the modification.

Figure 6:
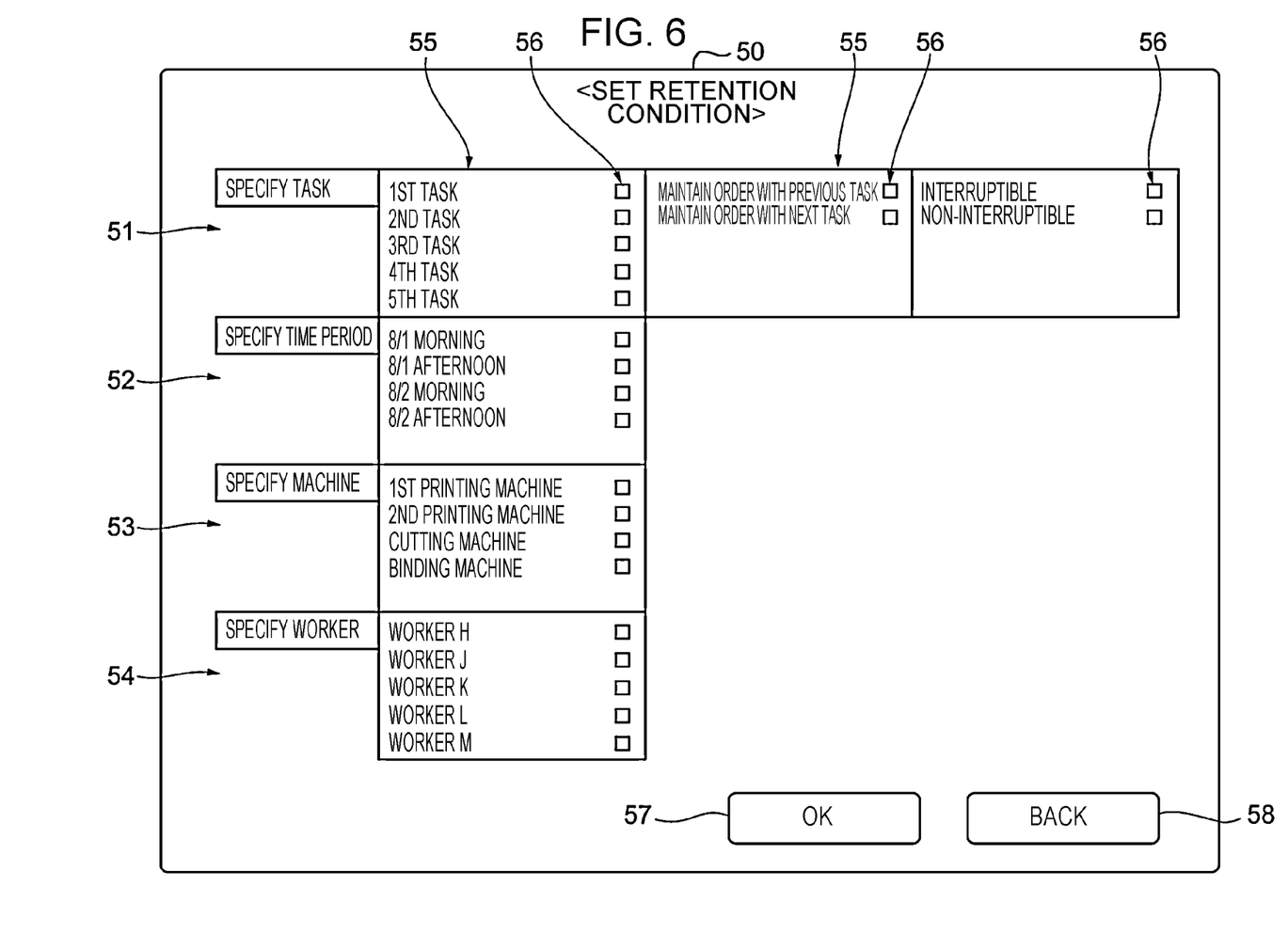
FIG. 6 is a diagram illustrating an example of a retention settings screen.

FIG. 6 is a diagram illustrating an example of a retention settings screen 50.

In the case where the retention setting image 32 displayed on the plan display screen 30 is specified, the display control unit 27 causes the retention settings screen 50 that receives a retention condition illustrated in FIG. 6 to be displayed on the display unit 15. On the retention settings screen 50, the display control unit 27 provides respective fields for receiving the specification of a task, the specification of a time period, and the specification of a machine as retainable items, namely a task specification field 51, a time period specification field 52, a machine specification field 53, and a worker specification field 54. The display control unit 27 causes a list 55 of desired content to retain and a selection field 56 for making the content selectable beside the content to be displayed on the retention settings screen 50. Additionally, the display control unit 27 causes a confirmation image 57 labeled "OK" that receives an instruction confirming the retention condition and a back image 58 labeled "Back" that receives an instruction to go back to the plan display screen 30 to be displayed on the retention settings screen 50. The display control unit 27 causes the plan display screen 30 to be displayed in the case where the back image 58 is specified.

Also, the display control unit 27 causes a list of already-assigned tasks to be displayed in the task specification field 51 of the retention settings screen 50. Also, when specifying a task, the display control unit 27 causes a condition for retaining the order between the specified task and another task performed before the specified task and a condition for retaining the order between the specified task and another task performed after the specified task to be selectably displayed. Furthermore, in the case of retaining the order between the specified task and the other task, the display control unit 27 causes a condition for allowing a different task to be assigned in between the specified task and the other task, or in other words treating the specified task and the other task as interruptible, and a condition for disallowing a different task to be assigned in between the specified task and the other task, or in other words treating the specified task and the other task as non-interruptible, to be selectably displayed.

Figure 7:
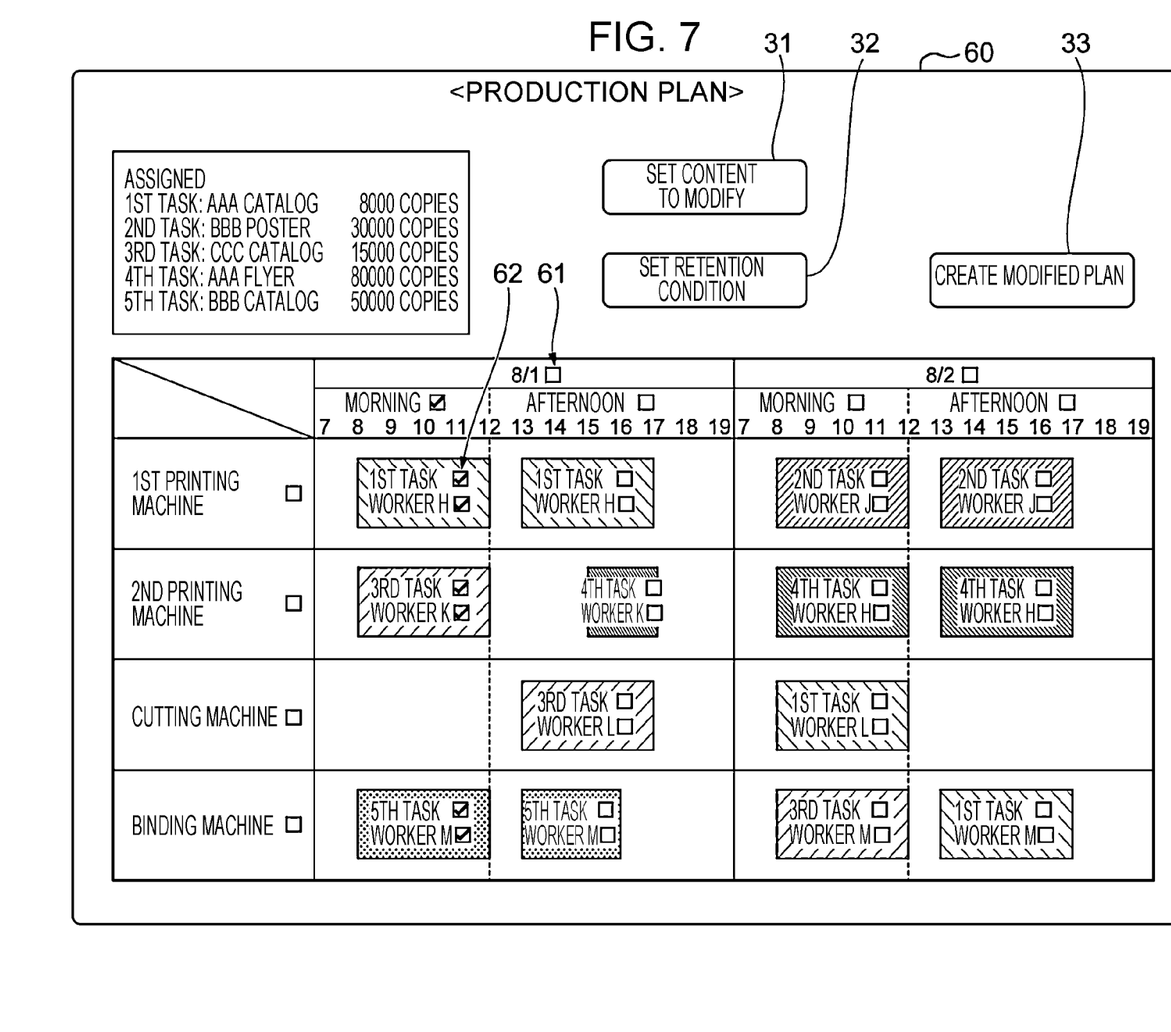
FIG. 7 is a diagram illustrating one example of a confirmation screen.

FIG. 7 is a diagram illustrating an example of a confirmation screen 60.

The display control unit 27 causes the confirmation screen 60 to be displayed in the case where the confirmation image 57 is specified while one of the retainable items displayed on the retention settings screen 50 is specified. The display control unit 27 causes a confirmation field 61 to be displayed beside the machines, tasks, workers, time periods, and dates in the current plan on the confirmation screen 60. Additionally, the display control unit 27 causes a selection mark (in FIG. 7, a check mark) 62 to be displayed in the confirmation field 61 of each item specified for retention on the confirmation screen 60. On the confirmation screen 60 illustrated in FIG. 7, the morning of August 1 has been specified for retention on the retention settings screen 50, and therefore the display control unit 27 causes the selection mark 62 to be displayed in the confirmation field 61 of each task and each worker assigned to the morning of August 1.

In the case where the modification execution image 33 is specified while the selection mark 62 is displayed in the confirmation field 61, the reception unit 20 receives the retention condition.

In the case where the modification execution image 33 displayed on the plan display screen 30 is specified, the modification unit 22 creates a modified plan.

Figure 8:
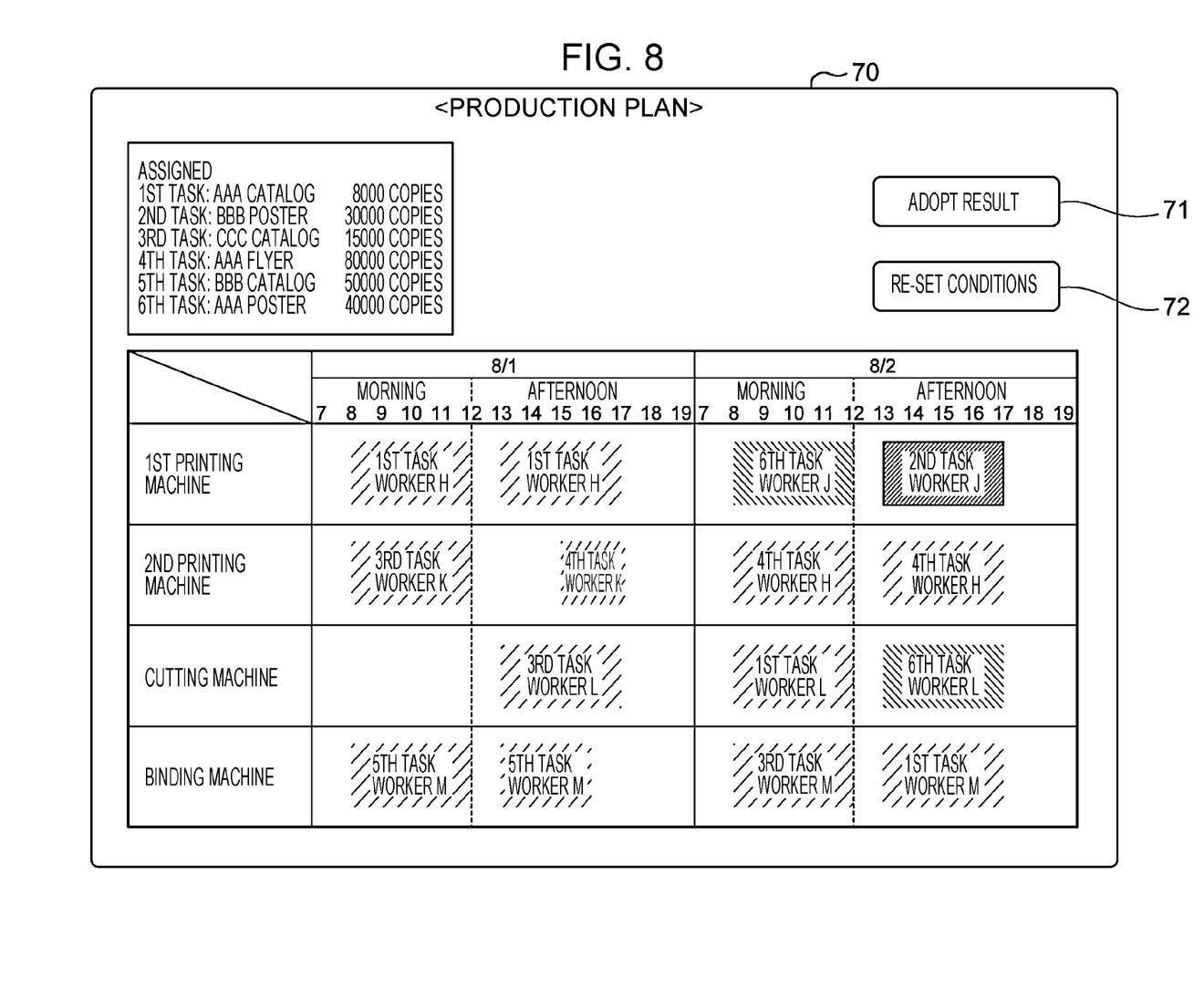
FIG. 8 is a diagram illustrating one example of a modification result screen.

FIG. 8 is a diagram illustrating an example of a modification result screen 70.

In the case where the modification unit 22 creates a modified plan, the display control unit 27 causes the modified plan to be displayed on the modification result screen 70. The display control unit 27 causes tasks that are unchanged between the original plan and the modified plan, tasks that are changed between the original plan and the modified plan, and tasks that are newly added to the modified plan to be displayed differently from each other. For example, as illustrated in FIG. 8, the display control unit 27 causes unchanged tasks to be displayed in a lighter color such as gray, and causes changed tasks to be displayed in a darker color such as black. Additionally, the display control unit 27 causes newly added tasks to be displayed in an intermediate color between the color of the unchanged tasks and the color of the changed tasks. This arrangement makes it possible to easily grasp which tasks have changed due to the modification of the plan. Note that FIG. 8 illustrates an example in which the 6th task is a newly added task, the assignment time of the 2nd task has changed, and the other 1st task, 3rd task, 4th task, and 5th task are unchanged.

The display control unit 27 causes an adoption image 71 labeled "Adopt Result" that receives an instruction for adopting the modified plan to be displayed on the modification result screen 70. The display control unit 27 also causes a re-set image 72 labeled "Re-Set Conditions" that receives an instruction for recreating a plan without adopting the modified plan to be displayed on the modification result screen 70. The display control unit 27 causes the plan display screen 30 to be displayed in the case where the re-set image 72 is specified.

In the case where the adoption image 71 displayed on the modification result screen 70 is specified, the modification unit 22 confirms the modified plan.

In the case where the modification unit 22 has assigned a task without satisfying the condition on the deadline margin time as described above, the display control unit 27 causes the task to be displayed in an alerting color such as red, for example. This arrangement makes it possible to easily grasp which tasks have been assigned without satisfying the condition on the deadline margin time due to the modification of the plan.

Alternatively, in the case where the modification unit 22 has assigned a task without satisfying the condition on the deadline margin time as described above, the display control unit 27 may cause a message or the like to be displayed to indicate that a plan satisfying all retention conditions and modification content could not be created.

In the exemplary embodiment described above, the functions of the control unit 10 are achieved by causing the CPU 11 given as one example of a processor use the RAM 13 as a work area to execute a program or the like loaded from the ROM 12 or the storage unit 14, but the configuration is not particularly limited to the above. For example, the functions of the control unit 10 may also be achieved by using two or more processors. Note that the term "processor" refers to hardware in a broad sense. Examples of the processor include general processors (such as a CPU) and dedicated processors (such as a graphics processing unit (GPU), an application-specific integrated circuit (ASIC), a field-programmable gate array (FPGA), and a programmable logic device).

Additionally, the production plan creation device 1 configured as above includes a processor (for example, the CPU 11), and in the case of receiving a modification request to add a new task to an existing plan including multiple tasks performed to produce a product using resources, the processor receives a condition on retaining the plan for a task included in the existing plan (for example, specifying a task to retain), and modifies the existing plan into a plan in which the multiple tasks and the new task are performed using the resources while accounting for the retention condition and the content of the new task. With this arrangement, it is possible to create a plan while also retaining an item assigned in the existing plan for which modification is undesirable, even in cases where the existing plan is modified by adding a task.

Also, the processor is capable of receiving a condition for retaining at least one of a time period during which to perform a task included in the existing plan and a resource used to perform the task as the retention condition. With this arrangement, the user is able to select a time period or a resource to retain for performing a task included in the existing plan.

Also, in the case where the retention condition is a condition for retaining a time period, the processor is also capable of receiving a condition for retaining the order between the task whose time period is retained and at least one of a task planned to be performed before the task whose time period is retained and a task planned to be performed after the task whose time period is retained. This arrangement makes it possible to accept a user demand, such as wanting to retain the order of multiple tasks for the same customer, wanting to retain the order of multiple tasks for products having the same type of paper, wanting to retain the order of multiple tasks having product shipping destinations in the same geographical region, and wanting to retain multiple tasks in an order that makes it easy for workers to perform the work.

Also, in the case where the retention condition is a condition for retaining the time period and the resource for a task scheduled to be performed inside a predetermined period (for example, on the morning of August 1) among the tasks included in the existing plan, the processor modifies the existing plan to modify the time period or the resource of a task scheduled to be performed outside the predetermined period while retaining the time period and the resource of the task to be performed inside the predetermined period. For example, in the example illustrated in FIGS. 7 and 8, the plan is modified such that the time period of the 2nd task is modified while retaining the time period and the resource of the 1st task. This arrangement makes it possible to modify the plan to reflect demands by the user.

Additionally, the processor is capable of receiving the specification of the start time or the end time of a new task. This arrangement makes it possible to provide a finely-tuned response to demands by the user.

Also, when determining the order in which to assign a task included in the existing plan and a new task to resources, the processor places a retained task earlier in the order than a non-retained task. This arrangement makes it possible to modify the plan according to the demands by the user with higher certainty compared to the case of placing a non-retained task earlier in the order than a retained task.

Note that in the exemplary embodiment described above, the modification content is received on the retention settings screen 50 illustrated as an example in FIG. 6, but an exemplary embodiment is not particularly limited to such a configuration. For example, in the case where the retention setting image 32 displayed on the plan display screen 30 is specified, the display control unit 27 may cause the display unit 15 to display the confirmation field 61 beside each machine, task, worker, time period, and date in the current plan like on the confirmation screen 60 illustrated as an example in FIG. 7, and also retain each item if the corresponding confirmation field 61 is pressed. For example, in the case where the confirmation field 61 beside the morning of August 1 is pressed, the tasks and workers assigned on the morning of August 1 may be retained. In such a case, if the confirmation field 61 beside the morning of August 1 is pressed, it is beneficial to display the selection mark 62 automatically in the confirmation field 61 beside each task and worker assigned on the morning of August 1. This arrangement makes it possible to reduce the user burden of pressing the confirmation field 61 for all desired items to retain.

Additionally, a program executed by the CPU 11 of the control unit 10 may be provided in a recorded state on a computer-readable recording medium, such as a magnetic recording medium (such as magnetic tape or a magnetic disk), an optical recording medium (such as an optical disc), a magneto-optical recording medium, or semiconductor memory. In addition, the program may also be downloaded by using a communication medium such as the Internet.

Furthermore, the program achieving an exemplary embodiment of the present disclosure causes a processor to execute, in the case of receiving a modification request to add a new task to an existing plan including multiple tasks performed to produce a product using resources, a function of receiving a condition on retaining the plan for a task included in the existing plan, and a function of modifying the existing plan into a plan in which the multiple tasks and the new task are performed using the resources while accounting for the retention condition and the content of the new task.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A production plan creation device comprising:
a processor configured to:
receive, in a case of receiving a modification request to add a new task to an existing plan including a plurality of tasks performed to produce a product using resources, a retention condition for retaining the plan for a task included in the existing plan, wherein the new task is not included in an already-created plan; and
modify the existing plan into a plan in which the plurality of tasks and the new task are performed using the resources while accounting for the retention condition and content of the new task, wherein the retention condition applies to the task included in the existing plan and is at least one of a time period during which to perform the task included in the existing plan and a resource used to perform the task included in the existing plan.

2. The production plan creation device according to claim 1, wherein
in a case where the retention condition is a condition for retaining the time period, the processor is configured to receive a condition for retaining an order between the task whose time period is retained and at least one of a task planned to be performed before the task whose time period is retained and a task planned to be performed after the task whose time period is retained.

3. The production plan creation device according to claim 2, wherein
in a case where the retention condition is a condition for retaining the time period and the resource for a task scheduled to be performed inside a predetermined period among the tasks included in the existing plan, the processor is configured to modify the existing plan to modify the time period or the resource of a task scheduled to be performed outside the predetermined period while maintaining the time period and the resource of the task to be performed inside the predetermined period.

4. The production plan creation device according to claim 3, wherein
the processor is capable of receiving the specification of a start time or an end time of the new task.

5. The production plan creation device according to claim 3, wherein
when determining an order in which to assign a task included in the existing plan and the new task to the resources, the processor is configured to place the retained task earlier in the order than a non-retained task.

6. The production plan creation device according to claim 2, wherein
the processor is capable of receiving the specification of a start time or an end time of the new task.

7. The production plan creation device according to claim 2, wherein
when determining an order in which to assign a task included in the existing plan and the new task to the resources, the processor is configured to place the retained task earlier in the order than a non-retained task.

8. The production plan creation device according to claim 1, wherein
in a case where the retention condition is a condition for retaining the time period and the resource for a task scheduled to be performed inside a predetermined period among the tasks included in the existing plan, the processor is configured to modify the existing plan to modify the time period or the resource of a task scheduled to be performed outside the predetermined period while maintaining the time period and the resource of the task to be performed inside the predetermined period.

9. The production plan creation device according to claim 8, wherein
the processor is capable of receiving the specification of a start time or an end time of the new task.

10. The production plan creation device according to claim 8, wherein
when determining an order in which to assign a task included in the existing plan and the new task to the resources, the processor is configured to place the retained task earlier in the order than a non-retained task.

11. The production plan creation device according to claim 1, wherein
the processor is capable of receiving the specification of a start time or an end time of the new task.

12. The production plan creation device according to claim 1, wherein
when determining an order in which to assign a task included in the existing plan and the new task to the resources, the processor is configured to place the retained task earlier in the order than a non-retained task.

13. The production plan creation device according to claim 1, wherein
the processor is configured to receive at least one of a modification of the time period in which to perform a task included in the existing plan or a resource used to perform the task, a removal of the task, and a modification of a running time period of the resource as the modification to the existing plan.

14. A non-transitory computer readable medium storing a program causing a computer to execute a process for creating a production plan, the process comprising:
receiving, in a case of receiving a modification request to add a new task to an existing plan including a plurality of tasks performed to produce a product using resources, a retention condition for retaining the plan for a task included in the existing plan, wherein the new task is not included in an already-created plan; and
modifying the existing plan into a plan in which the plurality of tasks and the new task are performed using the resources while accounting for the retention condition and content of the new task, wherein the retention condition applies to the task included in the existing plan and is at least one of a time period during which to perform the task included in the existing plan and a resource used to perform the task included in the existing plan.

* * * * *